US008603258B2

(12) United States Patent
Ventura et al.

(10) Patent No.: US 8,603,258 B2
(45) Date of Patent: Dec. 10, 2013

(54) PAINT AND INK REMOVER TWO-PHASE SYSTEM

(75) Inventors: Mark Ventura, Freehold, NJ (US); Steven Bolkan, Hopewell, NJ (US); Raymond F. Ashley, Pennington, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 1714 days.

(21) Appl. No.: 10/940,374

(22) Filed: Sep. 14, 2004

(65) Prior Publication Data

US 2006/0058208 A1  Mar. 16, 2006

(51) Int. Cl.
*B08B 3/00* (2006.01)

(52) U.S. Cl.
USPC .............................................. 134/38; 510/201

(58) Field of Classification Search
USPC ..................... 134/38; 510/174, 201, 206, 505
See application file for complete search history.

(56) References Cited

U.S. PATENT DOCUMENTS

| | | | |
|---|---|---|---|
| 3,616,803 A * | 11/1971 | Menkart et al. | 132/202 |
| 4,508,634 A | 4/1985 | Elepano et al. | 252/163 |
| 4,594,111 A | 6/1986 | Coonan | 134/3 |
| 4,680,133 A | 7/1987 | Ward | 252/153 |
| 5,007,969 A | 4/1991 | Doscher | 134/38 |
| 5,024,780 A | 6/1991 | Leys | 252/162 |
| 5,098,594 A | 3/1992 | Doscher | |
| 5,204,026 A | 4/1993 | Doscher-Good | 252/542 |
| 5,288,335 A | 2/1994 | Stevens | 134/38 |
| 5,298,081 A | 3/1994 | Marquis | 134/8 |
| 5,346,640 A | 9/1994 | Leys | 252/162 |
| 5,427,710 A * | 6/1995 | Stevens | 134/1 |
| 5,449,474 A | 9/1995 | Lucas et al. | 252/170 |
| 5,486,305 A | 1/1996 | Faryniarz et al. | 252/162 |
| 5,597,788 A * | 1/1997 | Stevens | 510/212 |
| 5,629,277 A | 5/1997 | Plishka | 510/202 |
| 5,690,747 A | 11/1997 | Doscher | 134/1 |
| 5,827,807 A | 10/1998 | Aoshima et al. | 510/118 |
| 6,040,284 A | 3/2000 | Marquis et al. | 510/201 |
| 6,162,776 A | 12/2000 | Marquis et al. | 510/201 |
| 6,169,915 B1 | 1/2001 | Krumbiegel | 600/372 |
| 6,187,108 B1 | 2/2001 | Machac et al. | 134/38 |
| 6,239,090 B1 | 5/2001 | Marquis et al. | 510/201 |
| 6,348,107 B1 * | 2/2002 | Whitton et al. | 134/38 |
| 6,369,009 B1 | 4/2002 | Machac et al. | 510/201 |
| 6,395,103 B1 | 5/2002 | Machac et al. | 134/40 |
| 6,420,327 B1 | 7/2002 | Machac et al. | 510/201 |

(Continued)

FOREIGN PATENT DOCUMENTS

| | | |
|---|---|---|
| DE | 10056958 A1 * | 5/2002 |
| WO | 9318102 | 9/1993 |
| WO | 0110961 | 2/2001 |

OTHER PUBLICATIONS

ANGUS Chemie GmbH Technical Data Sheet, Primary Amino Alcohols, TDS 10, pp. 1-11, copyright 2000 by ANGUS Chemie GmbH, a subsidiary of the Dow Chemical Company.

*Primary Examiner* — Michael Barr
*Assistant Examiner* — Jason Riggleman

(57) ABSTRACT

A two-phase paint and ink stripper composition comprises an aqueous phase containing a basic activator in the form of an amino-alkyl-alkanol and an organic phase which contains an alkylene carbonate and organic solvents. The paint stripper composition of the present invention is free from methylene chloride and does not contain monoethanol amine.

18 Claims, 6 Drawing Sheets

(56) References Cited

U.S. PATENT DOCUMENTS

| | | | |
|---|---|---|---|
| 6,479,445 B1 | 11/2002 | Machac et al. | 510/206 |
| 6,482,270 B1 | 11/2002 | Machac et al. | 134/38 |
| 6,548,464 B1 | 4/2003 | Machac et al. | 510/202 |
| 6,586,380 B2 * | 7/2003 | Marquis et al. | 510/201 |
| 6,608,012 B2 | 8/2003 | Machac et al. | 510/212 |
| 6,619,295 B1 * | 9/2003 | Okabe et al. | 132/202 |
| 2002/0198124 A1 | 12/2002 | Machac et al. | 510/201 |
| 2003/0108823 A1 | 6/2003 | Muraoka et al. | 430/329 |
| 2003/0119686 A1 | 6/2003 | Machac et al. | 510/201 |
| 2003/0148911 A1 * | 8/2003 | Smith et al. | 510/417 |
| 2003/0153477 A1 | 8/2003 | Fedrigo et al. | |
| 2005/0245412 A1 * | 11/2005 | Shah et al. | 510/201 |

* cited by examiner

PAINT AND INK REMOVER TWO-PHASE SYSTEM

BACKGROUND OF THE INVENTION

The present invention relates to a method of stripping paint and ink from a substrate. The stripper comprises an aqueous phase and an organic phase.

With the introduction of new and more durable types of synthetic resins and polymers in protective and decorative coatings, the problem of stripping has become increasingly difficult. Prior art paint removers typically contain blends of aromatic solvents, ketones, paraffin, methanol and diluents, for example, mineral spirits in order to reduce raw material costs. Those prior art strippers made with the foregoing solvents focused industry attention on the flammable and toxic characteristics.

As an alternative, improved prior art solvents utilize chlorinated solvents as a way to extend the usefulness of paint strippers while simultaneously reducing fire hazards associated with their use. Methylene chloride (dichloromethane) has been almost universally used as the solvent of choice, although some compositions have been formulated with ethylene dichloride and trichloroethylene, among other chlorinated hydrocarbon solvents. Many of the chlorinated hydrocarbons including methylene chloride are suspected carcinogens and methylene chloride is designated a hazardous substance under the Federal Hazardous Substance Act (FHSA). In addition, methylene chloride, as a high vapor pressure chlorinated solvent, probably contributes to atmospheric ozone depletion. Methanol is a poison if ingested and the U.S. Consumer Products Safety Commission requires a warning designating it as a poison when its concentration in consumer products exceeds 4 percent by weight. Toluene contains trace quantities of benzene, a known carcinogen, and acetone with its high vapor pressure and low flash point is highly flammable.

Paint strippers which include methylene chloride can be formulated to soften, lift and blister paint films. The stripper which is applied to the substrate by brush, immersion or spray and allowed to loosen the paint or varnish has an available work life of only several minutes because of the tendency of the methylene chloride to evaporate rapidly. Because of the high vapor pressure of methylene chloride, in an effort to extend the work life of the stripper made with that solvent, paraffin is often included as an evaporation suppressant. The paraffin functions by forming a thin film at the surface of the paint remover which retards evaporation. This thin film formation and resultant evaporation suppressant activity of paraffin is produced by the evaporation and surface chilling which occur when methylene chloride or mixtures containing methylene chloride are exposed to air. However, methylene chloride strippers must be handled carefully since they are highly toxic and can cause severe skin irritation. Further, even with the incorporation of paraffin, the volatility of the methylene chloride is still very high and when methylene chloride is formulated with, for example, toluene, the resulting high levels of hydrocarbon emissions necessitate the provision of good ventilation to safely use the methylene chloride paint strippers.

A further disadvantage of paint strippers formulated with methylene chloride is that the short work life compromises the ability of the stripper to function efficiently in many applications. For example, many industrial uses of paint strippers involve stripping accumulated paint from equipment and walls. Paint strippers utilizing methylene chloride suffer from the disadvantage that the short work life prevents the stripper from entering crevices in the accumulated paint layers thus creating the necessity, in some cases, of applying a large number of applications of stripper to remove a number of accumulated paint layers.

U.S. Pat. No. 6,348,107, issued Feb. 19, 2002, discloses a new method of stripping paint from a painted substrate surface. According to the invention, the surface is contacted with the aqueous phase of a two-phase liquid stripper composition comprising an aqueous phase which comprises water, dissolved water-soluble activator compound, and an organic solvent which has a solubility in water in the range 0.1 to 10% by weight at 20° C., the organic solvent being present in the aqueous phase at a concentration of about the saturation level (as at the ambient conditions for the method) and comprising also an organic phase comprising the said organic solvent, which organic phase is in interfacial contact with the aqueous phase. The organic solvent may include chlorinated hydrocarbons, for instance in combination with other organic solvents.

Suitable organic solvents for use in U.S. Pat. No. 6,348,107 include benzyl alcohol, methylene chloride, dibasic ester, which is an oxygenated solvent composed of a mixture of methyldiesters of glutaric, succinic and adipic acids, or ethyl-3-ethoxy propionate. The dissolved activator compound present in the aqueous phase of the composition may be any compound which increases the paint stripper activity. Such compound may often be a pH modifying compound in the form of an acid. Acid activators are usually organic acids, for instance trichloroacetic, alkyl benzene sulphonic acid, benzoic or lactic acid. The pH modifying compound can also be an alkali, for instance, alkali metal hydroxides, alkaline earth metal hydroxides, alkali metal silicates, and organic basic compounds such as amines or ammonium compounds. Another category of activator compound is an oxidizing agent. Examples of an oxidizing agent include hydrogen peroxide and potassium permanganate.

It is known to use water as an activator compound in organic solvent based paint strippers. Such compositions tend to have low levels of water, for instance less than 10%. Other paint stripper compositions comprising both water and organic solvents which are immiscible with water have been described. Generally emulsifiers are added in quantities such that an emulsion of one phase in the other phase is formed. Such emulsions are storage stable and are required not to separate before use. Alternatively, co-solvents may be added to create a homogeneous single phase system.

Single phase paint strippers containing ethylene carbonate or propylene carbonate and additional solvents such as esters, ethers, alcohols, or pyrrolidones such as N-methylpyrrolidone are known and exemplified by U.S. Pat. Nos. 5,288,335 and 5,449,474. Alkylene carbonate solvents, along with hydrogen peroxide, in an aqueous-based system are disclosed in a series of patents assigned to Huntsman Petrochemical Corporation. Examples of these are U.S. Pat. Nos. 6,040,284; 6,162,776; 6,369,009; and 6,608,012, among others.

SUMMARY OF THE INVENTION

The present invention is directed to a paint and ink remover composition in the form of two phases: an organic phase and an aqueous phase. Preferably, the phases are separated, but in interfacial contact as in aforementioned U.S. Pat. No. 6,348,107. The immiscible (i.e., only partially soluble) organic solvent and water are not in the form of an emulsion, but still provide a very effective paint and ink stripper. Additionally, an acceptable paint and ink remover can be obtained by mixing the two phases and including hydrotropes to provide a single-phase system.

The organic phase comprises a mixture of organic solvents, including an alkylene carbonate, dibasic esters, and alcohol, while the aqueous phase includes a unique basic activator comprising aminoalkyl alkanols, which have previously been used as an ingredient in metal working fluids. The amino alcohol activators of the present invention have not been classified as hazardous pollutants. This invention relates to an environmentally friendly and extremely effective paint and ink remover compared to the prior art.

DETAILED DESCRIPTION OF THE INVENTION

Figure 1:
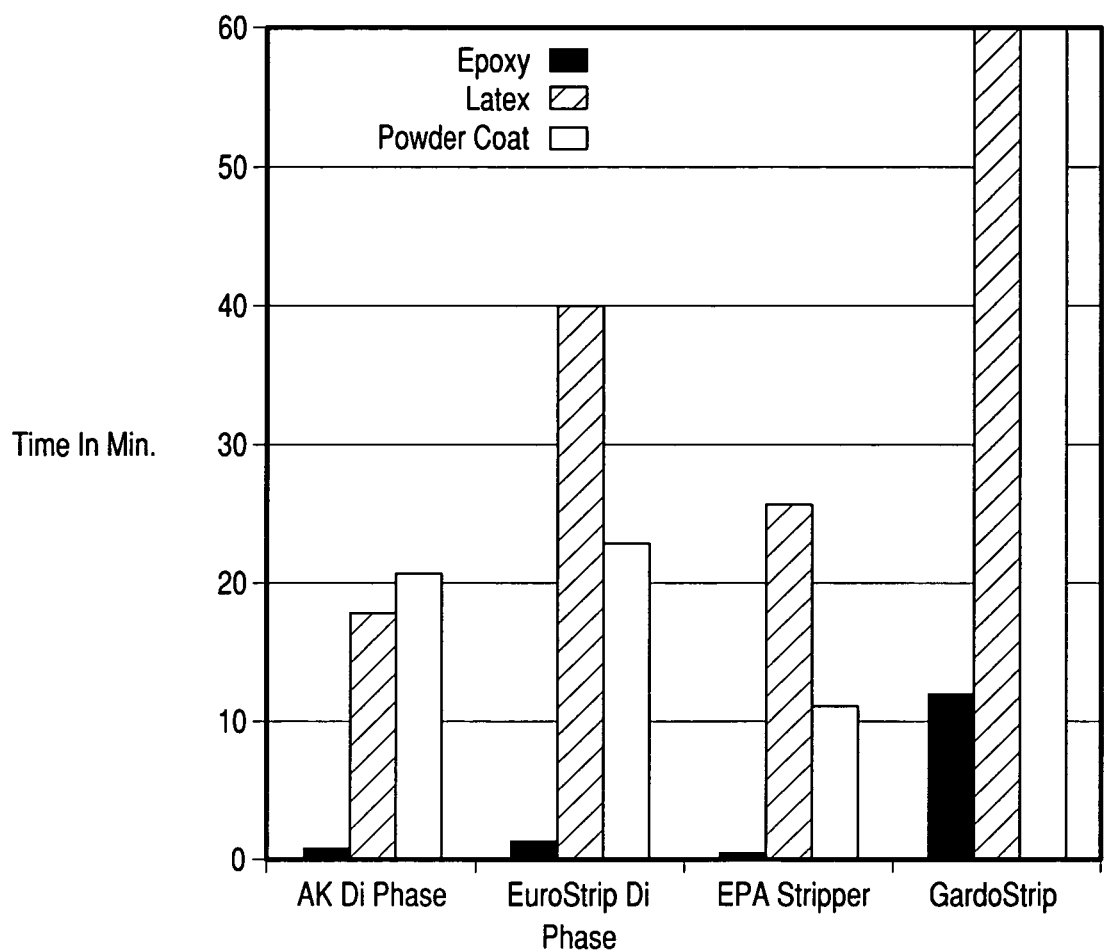
FIG. 1 is a bar graph comparing the paint stripping performance of the stripper of this invention with prior art commercial paint stripping compositions.

The stripper composition of the present invention is capable of removing epoxy, latex, and a variety of resinous powder coat paints and, as well, removing oil-based process, U.V., and lithographic inks. The stripper composition of this present invention can be used on any hard surface, including wood, plastic, cement, metal, etc. Importantly, the stripper composition of the present invention is non-combustible, non-flammable, and does not contain any chemical which is listed as being hazardous or toxic in any federal or state regulation. For example, the composition of the present invention does not contain any chemicals classified as Hazardous Air Pollutants, California proposition 65 chemical or SARA Title 2, Section 313. The paint and ink removal system of this invention meets SCAQMD (South Coast, Calif.) VOC regulations for paint strippers in 2005. The composition of the present invention does not contain any chlorinated hydrocarbon solvents, does not contain monoethanol amine (MEA), a California proposition 65 regulated chemical, nor does the composition contain ethyl-e-ethoxyproponate (EEP), which is a flammable solvent, all of which have been included in prior art compositions.

The stripper of the present invention is formed in two phases: an aqueous phase and an organic phase, which are mixed together, but preferably remain separated in use. Each of the aqueous and organic phases can be used separately as a stripper composition, or the aqueous and organic phase can be mixed together in a single phase utilizing hydrotropes, which emulsify the phases into a single phase composition. It is preferred, however, to mix the aqueous and organic phase, but maintain the phases separated and in interfacial contact during the stripping operation. The inventors believe that it is the aqueous phase of the stripper composition which provides the primary stripping function, that is which attacks the paint on the substrate surface, thereby enabling its removal. It has been found that some thermal or mechanical agitation may enhance stripping. This enhancement may be due to provision of some solvent contact with the substrate. The solvent phase primarily provides a reservoir for dissolved solvent in the aqueous phase. In view of the continuous interfacial contact, as solvent is dragged out of the aqueous phase by contact with paint surfaces, it is replenished from the solvent phase. The solvent thereby remains dissolved in the aqueous phase at saturation level.

It is preferred for organic solvents to be used which have a solubility in water at 20° C. in the range 0.5 to 6.0% by weight. The level of dissolved solvent in the aqueous phase during the paint removal method may be higher than the end of that range, since it is possible for the methods to be carried out under conditions at which the solubility of the solvent in water is higher. Thus where the method is carried out at raised temperatures, the level of organic solvent in the aqueous phase may be at least 50% higher than the saturation level at 20° C. for instance at least 100% higher or more.

The organic phase of the stripper composition of this invention includes a mixture of solvents including an alkylene carbonate, one or more dibasic esters (DBEs), and an alcohol.

The alkylene carbonate is preferably in the form of an alicyclic carbonate compound, represented by the formula:

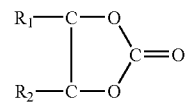

wherein $R_1$ and $R_2$ are selected from the group consisting of hydrogen, methyl, or ethyl. Examples of alicyclic carbonate compounds having this formula which are preferred for use in the composition of the present invention include propylene carbonate and ethylene carbonate. As is known to those skilled in the art, the polar character of those carbonate compounds stems from the strong positive polarity which the oxygen bonding imparts to the carbonate end of the molecule.

Of the two preferred cyclic carbonates noted above, the propylene carbonate is most preferred in the stripper composition of the present invention, in that, while both ethylene and propylene carbonate degrade quickly and safely in the environment, and both exhibit desirably low vapor pressures (as will be discussed further below), the propylene carbonate is considerably safer from the standpoint of personnel exposure, inasmuch as it degrades to safe intermediates and end products within the human metabolic system, while this is not true of ethylene carbonate. In fact, the safety of propylene carbonate is attested to by the fact that it has been widely used is cosmetics. The alkylene carbonate is present in the organic phase in an amount of about 10-50 wt. %.

The organic phase of the compositions of this invention also includes an alcohol. Representative examples of such alcohols include methanol, ethanol, propanol, butanol, and benzyl alcohol. In the practice of this invention, benzyl alcohol is preferred. Generally, the organic phase of this invention contains from 25 to about 75 percent by weight alcohol.

In general, the DBE used in this invention include aliphatic diesters having a molecular weight of up to about 200. DBE has the advantage of being considered to be safe and of low toxicity. More than one dibasic ester can be used in the present compositions. DBE is a well known material and is currently available commercially. In general, the DBE used in this invention may be described as being a $C_1$ to $C_6$ dialkyl ester of a $C_2$ to $C_{10}$ aliphatic di-acid, and particularly a $C_1$ to $C_4$ dialkyl ester of a $C_2$ to $C_6$ aliphatic di-acid. For example, the DBE used in the practice of this invention may be derived from various di-acids such as from adipic acid, glutaric acid and succinic acid.

The amount of DBE used in the practice of this invention may vary widely. In general, the amount of DBE may be from about 10 percent by weight to about 50 percent by weight of the organic phase.

The aqueous phase of the stripper composition of this invention includes a unique basic activator which increases the paint stripper activity. In particular, the aqueous phase includes one or more amino-alkyl-alkanols wherein the alkyl has 14 carbons and the alkanol has 3-12 carbons. In particular, the amino-alkyl-alkanols will be present in amounts ranging from 5 to 25 wt. %. These materials have been known and used as buffers in metal working coolants, but are not believed to have been used in paint stripper compositions. Examples of basic activators include 2-amino 2-methyl 1-propanol, 2-amino-1-butanol, 2-amino-2-methyl-1,3-propanediol, 2-amino-2-ethyl-1,3-propanediol and tris(hydroxymethyl) aminomethane.

The aqueous phase can also include acid activators such as organic acids, including alkyl benzene sulfonic acid, benzoic or lactic acid, or other organic acid. Such acid activators can be present in amounts up to 5 wt. % of the aqueous phase.

The aqueous phase may, in addition to the above-mentioned activator compounds, include an oxidizing agent, which has been found to improve the performance of the aqueous phase. In this invention, an amine oxide has been found to be a useful oxidizing agent. In general, the oxidizing agent may comprise up to about 10 wt. % of the aqueous phase, though typically such component is present in amounts of less than 5 wt. %.

In general, the organic and aqueous phases are mixed together in an approximately 1:1 weight ratio. Slight deviations from a 1:1 weight ratio may be utilized depending upon the type of coating which is to be removed.

The paint stripper composition may optionally contain surfactants, generally in low amounts such that the surfactant does not lead to the formation of an emulsion between the immiscible aqueous and organic phases. The inclusion of such surfactants may improve wetting of the substrate surface. The surfactant is, generally, present in an amount of less than 15% by weight, more preferably less than 5% by weight, based on the total stripper composition weight. The higher levels of surfactant can be used when the two phases are mixed for use as a single phase system.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfonamides, C10-18 alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, C8-18 alkyl pyrrolidone, cocoaminopropionic acid and polyethoxy amino salts thereof.

Adjuvants such as corrosion inhibitors can be added, and include ethoxylated butynediol, petroleum sulfonates, blends of propargyl alcohol and thiourea. If used, the amount of such corrosion inhibitors is typically up to about 2% by weight of the total composition.

The present invention is of particular value where the stripping method uses an immersion technique, in which the article from which paint is to be stripped is dipped into a bath containing the stripper composition. In such embodiments, the stripper composition is generally present as a two-phase system with top and bottom continuous layers. Preferably the bottom layer is the organic solvent layer, that is, the organic solvent preferably has a higher density than water. In this embodiment, the article from which paint is to be stripped is immersed in the top aqueous phase only and not into the bottom organic phase. After immersion for a suitable period of time, the article is removed from the bath.

The bath is reused for stripping paint from further articles. Where the bath is reused, it is generally necessary to replenish the bath to maintain an appropriate mixture of ingredients in the top aqueous phase. It is found that both solvent and water are dragged out of the bath whilst in addition the activator compound and solvent are consumed. Replenishment of the bath is straightforward in the invention which is convenient for the user. Thus, since the bottom organic phase provides a reservoir of solvent for dissolution into the top aqueous phase, as the volume of the top phase becomes lower, it can be replenished merely by adding water. The aqueous phase maintains its saturation level of solvent since solvent can pass from the organic phase into the aqueous phase across the interfacial layer. The level of activator compound is maintained at the desired level by a continuous monitoring system and addition of activator compound either in neat form or in the form of a concentrated replenishment solution, usually in water. It is possible to use automated replenishment to control the total volume and activator compound concentration of the aqueous phase.

The total level of water in the aqueous phase of the stripper composition is generally in the range 50 to 95% by weight, preferably in the range of 70 to 90% by weight.

An alternative embodiment of the stripping method of the invention, for non-immersion purposes, uses an application in place system, in which the stripper composition is generally brushed, sprayed or otherwise applied to the painted surface of a large substrate. Since such surfaces will include non-horizontal surfaces, in order to ensure that adequate levels of stripper composition are retained in contact with the painted substrate over sufficient periods of time, it is generally desirable to use a thickened composition. The thickened compositions may comprise a continuous aqueous phase and a dispersed organic phase. The organic solvent can cross the interface between the phases thereby providing a reservoir for solvent in the aqueous phase as in the first embodiment of the invention. The dispersion may be storage stable by virtue of the provision of a thickened continuous aqueous phase (as opposed to being an emulsion of dispersed organic phase in continuous aqueous phase).

Suitable thickeners for use in this embodiment of the invention must provide a thickening ability for the aqueous phase in the presence of the organic solvent at saturation levels and in the presence of the activator compound. Although naturally derived thickeners such as cellulose and starch derivatives may be used, the present inventors have found that improved performance and stability can be achieved using synthetic thickeners, for instance acrylic based associative thickeners. Inorganic thickeners, such as clays, for instance bentonite, especially surface treated bentonite, may alternatively be used.

In the stripping method of the present invention, the substrate should, after having been in contact with the stripping composition for an adequate time to loosen the paint, be rinsed to remove stripper composition and loosened paint. Where the substrate has been immersed in a bath of the stripper composition, the article is removed from the bath and rinsed, for instance by immersion and/or spraying with water or an aqueous rinse solution. It may be desirable to use a pressurized water spray or to apply other mechanical assistance to remove loosened paint from the substrate. Where the stripper composition is applied in place, it is rinsed by a spray of water or aqueous rinse solution, for instance using a pressurized water spray.

The method of the present invention may be carried out under ambient, room temperature conditions. Alternatively the temperature of the stripper composition may be raised for instance where the composition is applied by immersion. Thus a bath of stripper composition may be heated to a temperature at which the stripping rate is improved. The present inventors have found that temperatures in the range 40 to 90° C. can be used. Generally it is found that improved results can be achieved when the temperature is raised to above 50° C. or even above 60° C., although it is generally unnecessary to use temperatures of more than 80° C. Thickened compositions are generally applied at ambient temperatures.

Where the composition is contacted with the substrate by immersion, it may be desirable for the body of stripper to be mechanically agitated. Such agitation should generally be inadequate to provide any stability to the two-phase mixture against separation. Thus, although such agitation may result in the temporary creation of a dispersed phase, this dispersed phase mixture will rapidly separate into two phases upon removal of the mechanical agitation.

Example 1

A paint & ink removal two-phase system that does not contain monoethanolamine and provides faster removal of epoxy, latex & powder coat paints is shown in Tables 1 and 2. The composition was formed by mixing the aqueous phase with the organic phase in a weight ratio of 1:1.

TABLE 1

| Organic Phase | |
|---|---|
| Component | % |
| Propylene Carbonate | 25.00 |
| RDPE Dibasic Esters[1] | 20.00 |
| Benzyl Alcohol | 50.00 |
| Tomadol 91-6[2] | 2.45 |
| Tomadol 1-73B[3] | 2.45 |
| Surfadonne LP-100[4] | 0.10 |
| | 100.00 |

[1]Dibasic esters
[2]C9-11 alcohol ethoxylate
[3]C11 alcohol ethoxylate
[4]2-pyrrolidinone, 1-octyl-N-(n-octyl)-2-pyrrolidone

TABLE 2

| Aqueous Phase | |
|---|---|
| Component | % |
| DI Water | 80.33 |
| AMP-95[5] | 12.50 |
| SXS-40[6] | 2.50 |
| Barlox 12i[7] | 1.25 |
| Surfadone LP-100 | 0.13 |
| Cobratec TT-100[8] | 0.13 |
| Alcosperse 415[9] | 0.38 |
| Plurafac LF-1200[10] | 0.50 |
| Tomadol 1-73B | 0.50 |
| Tomadol 91-6 | 1.25 |
| Belcor 575[11] | 0.25 |
| Naxel AAS-98S[12] | 0.28 |
| | 100.00 |

[5]2-Amino-2-methyl-1-propanol
[6]Sodium Xylene Sulfonate (40%)
[7]Amine Oxide
[8]Tolyltriazole
[9]Acrylic copolymer partial sodium salt
[10]Alcohol alkoxylate
[11]Hydroxyphosphono-acetic acid
[12]Dodecylbenzene sulfonic acid

Example 2

100 ml of each of the paint stripper of this invention and the comparative commercial strippers were placed in separate 250 ml beakers. Steel coupons measuring 1"×2" were evenly coated with 0.5 gm of the epoxy, latex, and powder paint samples. The coupons were placed in the beakers, and the stripper compositions heated to 160° F. under mild agitation. The agitation resulted in a dispersed phase for the diphasic systems, but not a single solvated phase. Thus, the phases separated upon removal of agitation.

FIG. 1 shows the time for each stripper to remove all of the paint sample from the coupons. In FIG. 1, the AK Di phase represents the 1:1 mix of the aqueous and organic phases shown in Tables 1 and 2. The EuroStrip Di phase is a commercial stripper that utilizes monoethanolamine and is formulated according to U.S. Pat. No. 6,248,107, assigned to Chemetall PLC. The EPA Stripper is a methylene chloride-based commercial product, also from Chemetall PLC. Gardostrip, another product from Chemetall, is an "environmentally friendly" single phase weak acid solvent type of product. The paint removal performance is plotted as paint type (epoxy, latex or powder coat) vs. time required to remove all the paint from the coupons in minutes. Thus, the lower the bar, the shorter cleaning time was required and the better the paint removal performance.

Example 3

Figure 2:
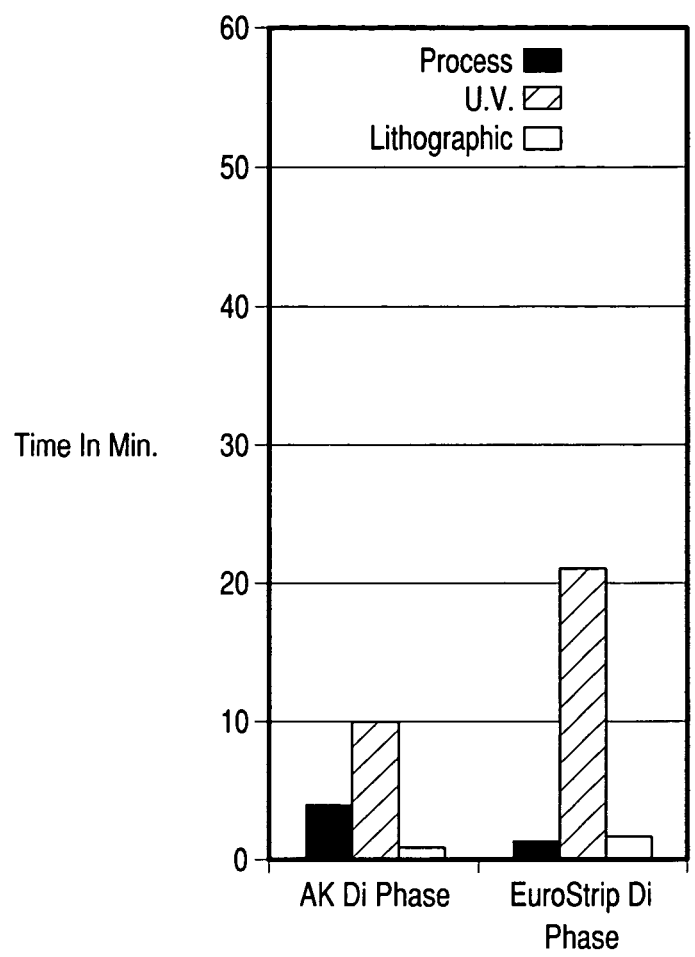
FIG. 2 is a bar graph comparing the ink cleaning performance of the stripper of this invention with prior art commercial paint stripping compositions.

In this example, the two-phase stripper system of this invention and as used above was shown to provide faster removal of oil-based process, U.V. and lithographic inks than other non-methylene chloride-based diphasic product. In FIG. 2, a comparison of ink cleaning performance at 160 F° is provided for the di phase stripper of this invention with the EuroStrip di phase stripper that utilizes monoethanolamine. The ink removal performance is plotted as ink type (process, U.V. or lithographic) vs. time required to remove all the ink applied (1 gm) on the coupons in minutes. Again, the lower the bar, the shorter cleaning time was required and the better the ink removal performance.

Example 4

Figure 3:
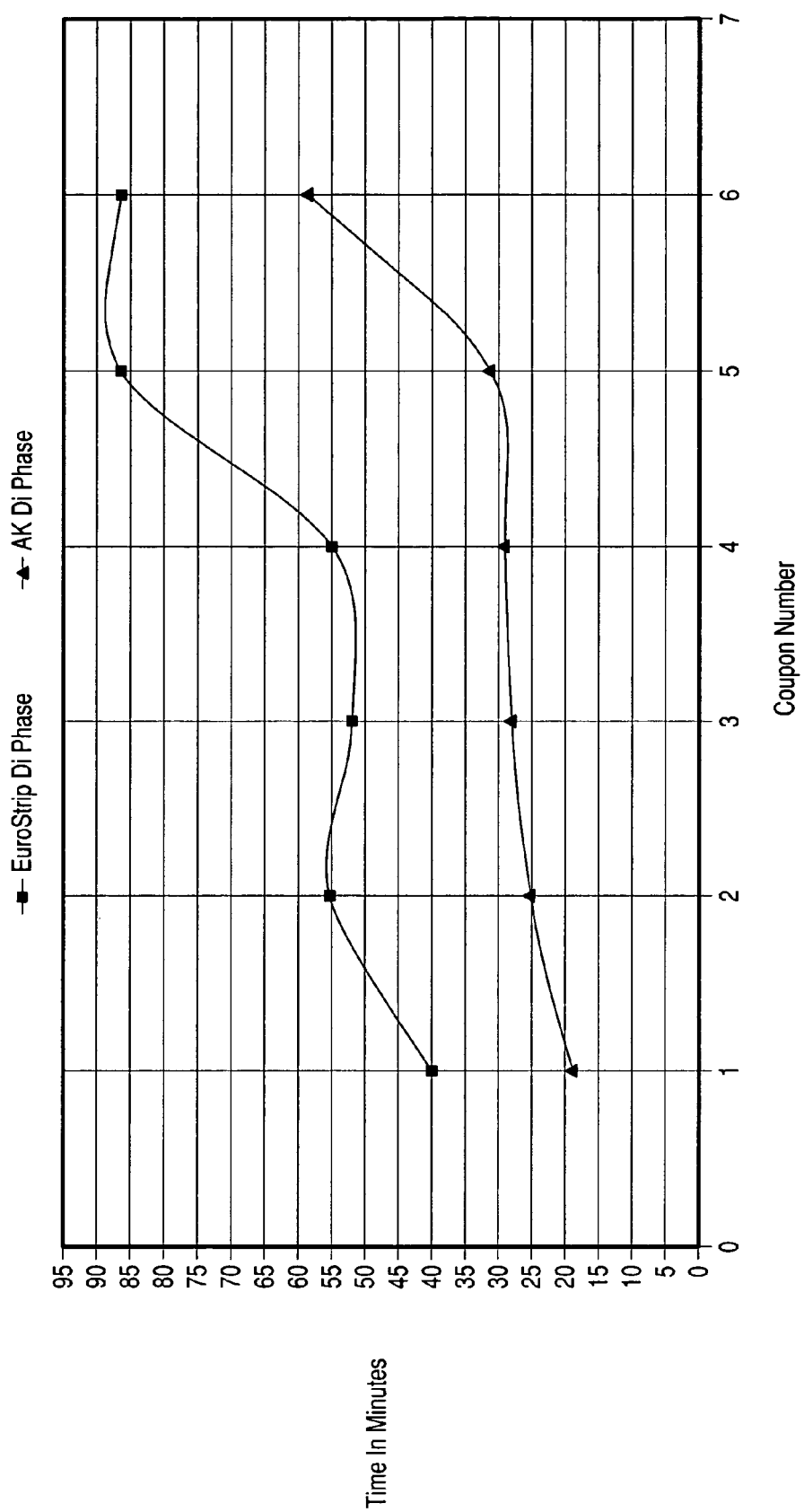
FIG. 3 is a graph comparing the bath life of the stripper of this invention with the bath life of a commercial product during latex paint removal.

The paint & ink removal two-phase system of the present invention also provides an improved work life and thus provides improved cleaning for longer time intervals than prior art strippers. In this example, the steel coupons were evenly painted with a latex paint. FIG. 3 plots the latex paint removal performance as the Coupon Number vs. Time required to remove all the paint from the coupon. The Coupon Number refers to the number of painted test panels that were successively placed in the same paint stripping system after the previous coupon was stripped. Thus, it becomes more difficult to maintain a high level of cleaning performance as more test coupons are introduced to the paint strippers (or as the Coupon Number increases). Products that exhibit a higher level of paint stripping performance as the Coupon Number increases exhibit an improved cleaner bath lifetime. As can be seen from FIG. 3, the bath life of the stripper of this invention is vastly improved over the bath life of the comparative commercial product. Thus, the paint from the last Coupon No. 6 was stripped in an hour utilizing the stripper of the present invention, while it took over 85 minutes to remove the paint from Coupon No. 6 utilizing the comparative stripper.

Example 5

The organic and aqueous phases can also be combined into a single phase product which also exhibits very good paint & ink removal performance. This all-in-one composition is shown in Table 3.

TABLE 3

Single Phase Combination of Organic and Aqueous Phases

| Component | % |
|---|---|
| Propylene Carbonate | 12.500 |
| RDPE Dibasic Esters | 10.000 |
| Benzyl Alcohol | 25.000 |
| Tomadol 91-6 | 01.850 |
| Tomadol 1-73B | 01.475 |
| Surfadonne LP-100 | 00.115 |
| DI Water | 40.165 |
| AMP-95 | 06.250 |
| SXS-40 | 01.250 |
| Barlox 12i | 00.625 |
| Cobratec TT-100 | 00.065 |
| Alcosperse 415 | 00.190 |
| Plurafac LF-1200 | 00.250 |
| Belcor 575 | 00.125 |
| Naxel AAS-98S | 00.140 |
|  | 100.000 |

Figure 4:
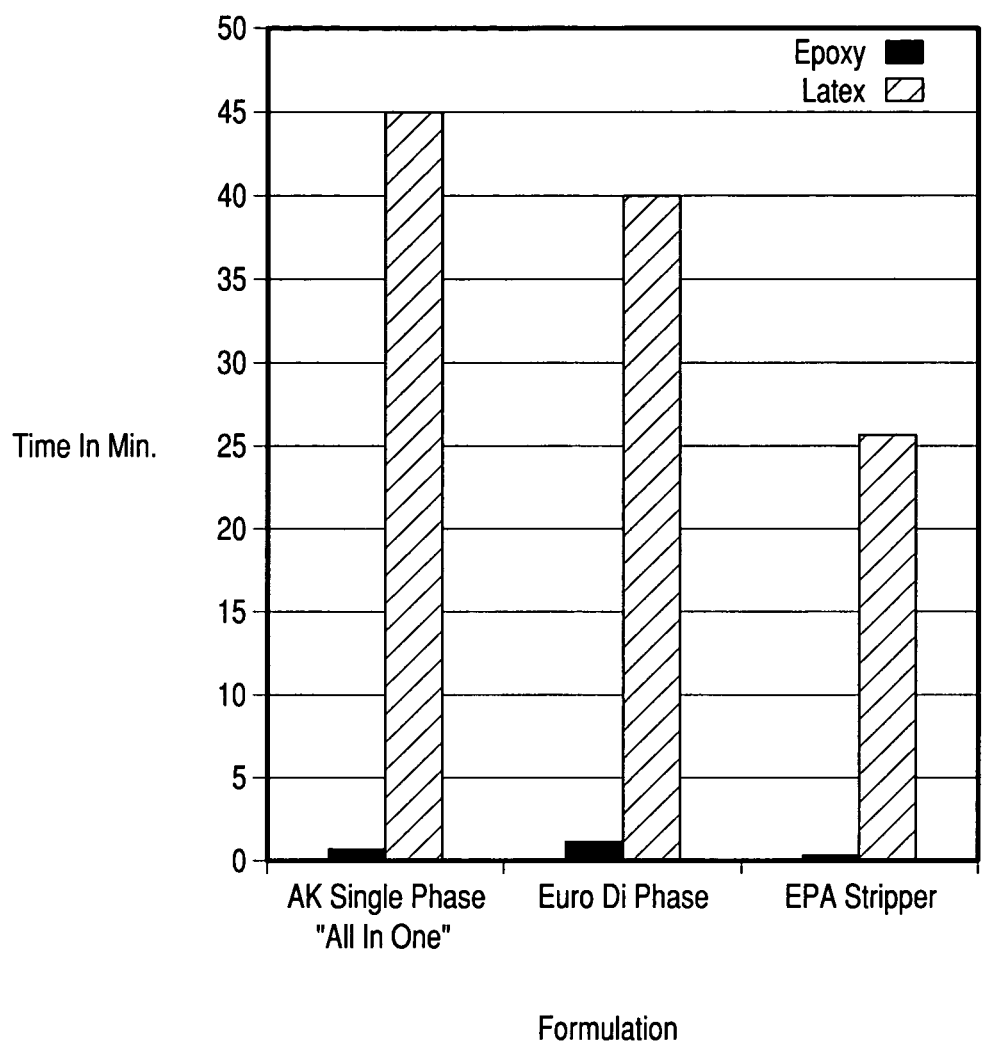
FIG. 4 is a bar graph comparing the paint stripping performance of a single phase stripper in accordance with this invention with commercial products.

As can be seen from FIG. 4, the performance of the all-in-one composition of this invention does not perform as well as the two-phase system. However, with respect to the epoxy paint, the all-in-one system is comparable to the comparative commercial strippers.

Example 6

The bath life of the single-phase system of the present invention ("All-in-One") was compared with the bath life of the commercial EuroStrip di phase system with respect to paint removal. The bath life test was the same as conducted in Example 4.

Figure 5:
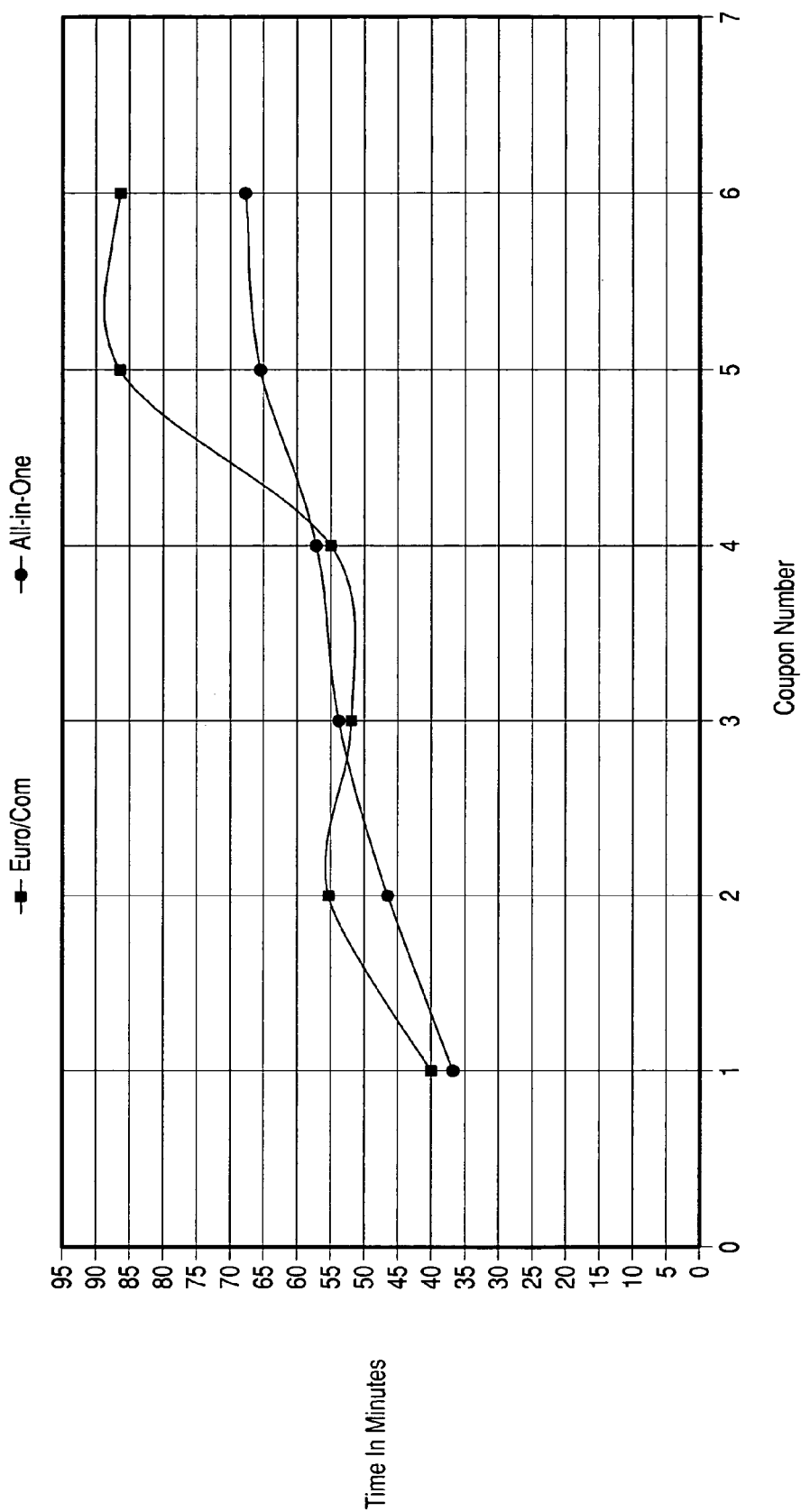
FIG. 5 is a graph comparing the bath life of a single phase stripper in accordance with the present invention with the bath life of a commercial paint stripper during latex paint removal.

As shown in FIG. 5, the single-phase system of the present invention had an extended bath life compared to the prior art commercial stripper. The aqueous phase of the stripper of this invention was found to provide superior paint removal properties compared to the aqueous phase component of the prior art (EuroStrip).

Example 7

Figure 6:
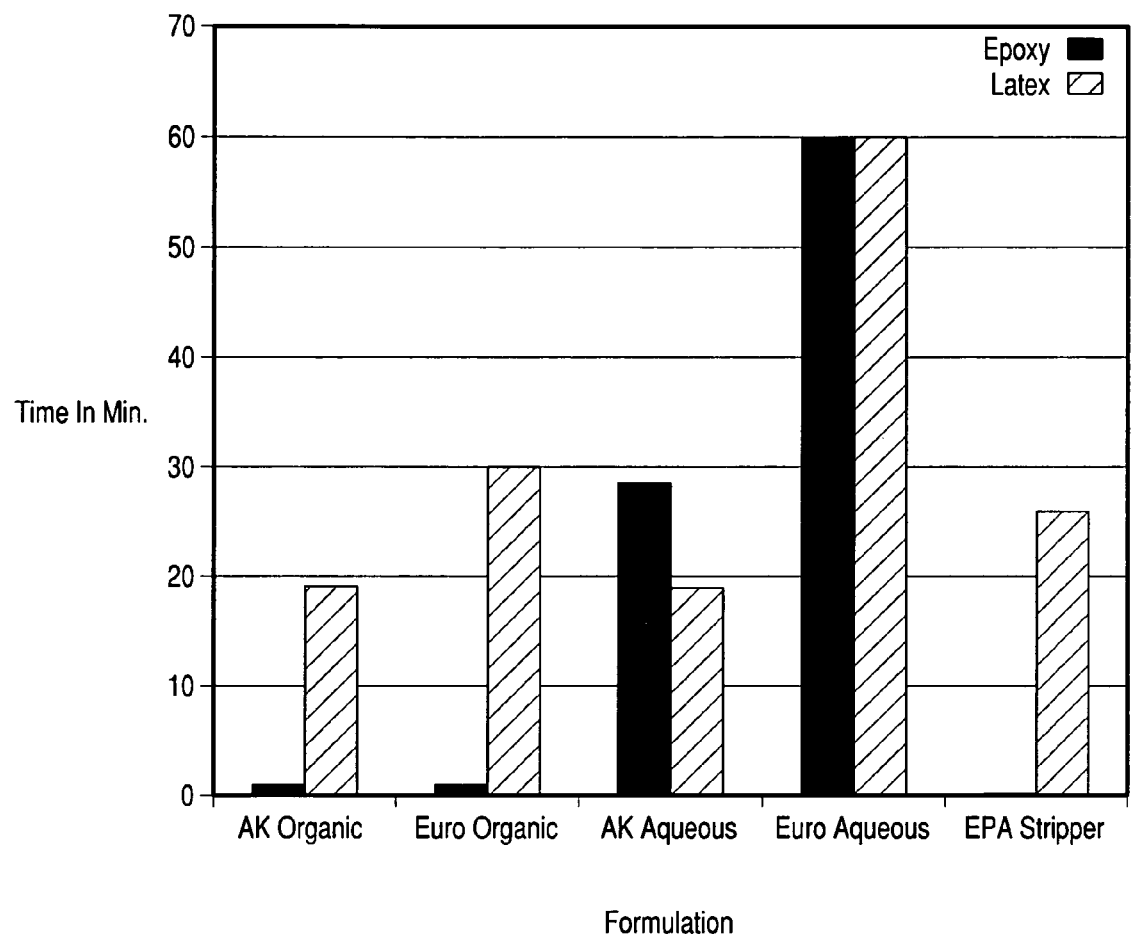
FIG. 6 is a bar graph comparing the paint stripping performance of the separate aqueous and organic phases of the stripper of this invention with the separate aqueous and organic phases of a commercial product.

FIG. 6 tabulates the performance of the separated organic and aqueous phases alone of the stripper of this invention and with the separate phases of the prior art products. The test procedure was the same as used in Example 2. The performance of the methylene chloride-based product (EPA stripper) is also shown for comparison.

What is claimed is:

1. A paint and ink stripper in a form of a two-phase liquid stripper composition comprising:
   an aqueous phase comprising 50-95 wt. % water and 5-25 wt. % of a dissolved basic amino-alkyl-alkanol activator, said activator not being monoethanol amine,
   an organic phase comprising an organic solvent, said organic solvent being devoid of chlorinated solvents; wherein said organic solvent comprises a mixture of dibasic esters and an alcohol, said aqueous phase and organic phase being in interfacial contact with each other and not forming an emulsion or a single-phase solution without agitation.

2. The stripper composition of claim 1 wherein said amino-alkyl-alkanol includes an alkyl group having 1-4 carbon atoms, and wherein said alkanol has 3-12 carbon atoms.

3. The stripper composition of claim 2 wherein said amino-alkyl-alkanol is 2-amino 2-methyl 1-propanol.

4. The stripper composition of claim 1 wherein said alcohol solvent is benzyl alcohol.

5. The stripper composition of claim 1 wherein said organic phase further contains alkylene carbonate.

6. The stripper composition of claim 5 wherein said alkylene carbonate is present in amounts of 10-50% by weight of said organic phase.

7. The stripper composition of claim 1 wherein said dibasic esters comprise the $C_1$ to $C_6$ dialkyl esters of a $C_2$ to $C_{10}$ aliphatic diacid.

8. The stripper composition of claim 1 wherein said organic phase includes a mixture of at least two non-ionic surfactants.

9. The stripper composition of claim 8 wherein said non-ionic surfactants comprise ethoxylated $C_9$ to $C_{11}$ alcohols.

10. The stripper composition of claim 4 wherein said benzyl alcohol is present in amounts of from 25-75 wt. % of said organic phase.

11. The stripper composition of claim 1 wherein said aqueous phase and said organic phase are present in said stripper composition in approximately a 1:1 weight ratio.

12. The stripper composition of claim 1 wherein said aqueous phase contains 70-90 wt. % water.

13. The stripper composition of claim 12 wherein said aqueous phase further includes at least one surfactant.

14. The stripper composition of claim 1 comprising less than 15% by weight of one or more surfactants.

15. The stripper composition of claim 1 wherein said organic phase further contains propylene carbonate, and a mixture of organic solvents comprising at least one dibasic ester and benzyl alcohol.

16. A method of stripping paint from a substrate surface comprising the steps of:
   (i) providing a two-phase liquid stripper composition comprising;
      (a) an aqueous phase which comprises water and a basic amino-alkyl-alkanol dissolved activator compound, said activator compound not being monoethanol amine;
      (b) an organic phase comprising an alkylene carbonate and an organic solvent, said organic solvent being devoid of chlorinated solvents, which organic phase is in interfacial contact with the aqueous phase;

(ii) contacting the substrate surface with said stripper composition; and (iii) stripping said paint from the substrate surface.

17. The method of claim 16 in which the composition contains a thickener and is supplied as a coating to a substrate.

18. A method of stripping paint from a substrate surface comprising the steps of:
   (i) providing a two-phase liquid stripper composition comprising;
      (a) an aqueous phase which comprises 50-95 wt. % water and 5-25 wt. % of a basic amino-alkyl-alkanol dissolved activator compound, said activator compound not being monoethanol amine;
      (b) an organic phase comprising an organic solvent, said organic solvent being devoid of chlorinated solvents; wherein said organic solvent comprises a mixture of dibasic esters and an alcohol; said aqueous phase and organic phase being in interfacial contact with each other, and not forming an emulsion or single phase solution without agitation;
   (ii) contacting the substrate surface with said stripper composition; and
   (iii) stripping said paint from the substrate surface.

* * * * *